United States Patent
Crosby

Patent Number: 5,533,297
Date of Patent: Jul. 9, 1996

[54] FISHING LURE CONTAINER

[76] Inventor: Robert D. Crosby, 70 E. Sunset Ave., Salt Lake City, Utah 84115

[21] Appl. No.: 205,786

[22] Filed: Mar. 4, 1994

[51] Int. Cl.[6] ............................................. A01K 97/00
[52] U.S. Cl. ............................................. 43/57.1; 43/57.2
[58] Field of Search .......................... 43/57.1, 57.2, 43/57.3, 25.2, 43.11; 206/315.11

[56] References Cited

U.S. PATENT DOCUMENTS

| | | | |
|---|---|---|---|
| 2,675,640 | 4/1954 | Adamek | 43/57.1 |
| 2,729,913 | 1/1956 | Holwerda | 43/57.1 |
| 3,039,226 | 6/1962 | Bagdonas | 43/57.2 |
| 3,224,134 | 12/1965 | Holcombe | 43/57.1 |
| 3,949,511 | 4/1976 | Goldhaft | 43/57.1 |
| 4,681,220 | 7/1987 | Beneke | 43/25.2 |
| 4,862,635 | 9/1989 | Conte | 43/57.1 |
| 4,947,577 | 8/1990 | Abbotoy | 43/57.1 |
| 4,977,700 | 12/1990 | Perlman et al. | 43/57.2 |

Primary Examiner—Chuck Y. Mah

[57] ABSTRACT

A new fishing lure container for storing fishing lures with a leader line attached to prevent tangling with other lures, kinking of the leader line, or injury from exposed fishhooks. The fishing lure container comprises a tubular envelope formed of rigid impact-resistant waterproof material. The envelope has an open end with a raised lip thereon wherethrough a fishing lure may be passed. The lip has a longitudinal V-notch formed therein wherethrough the fishing lure leader line may extend from the envelope, the extending leader line being wrapped around the outside of the envelope for non-kinking storage.

2 Claims, 4 Drawing Sheets

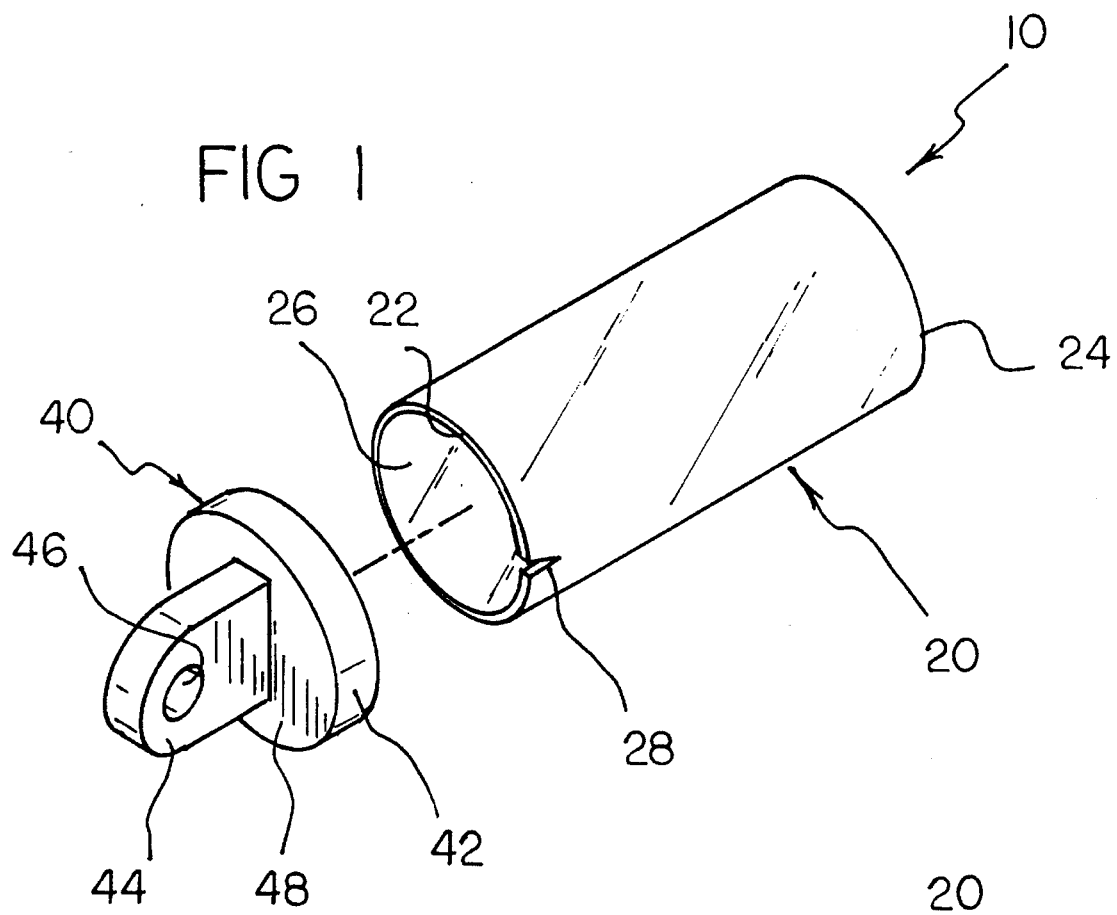
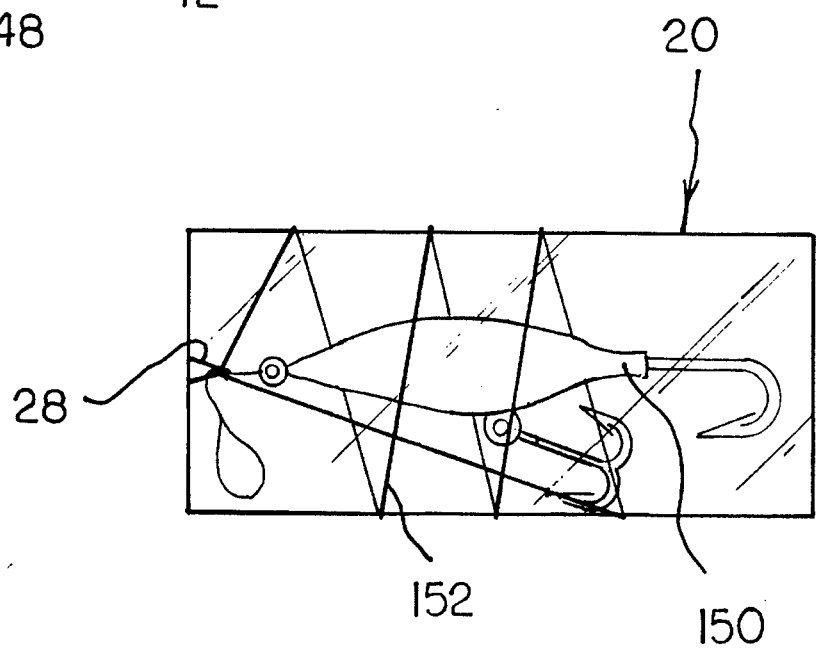

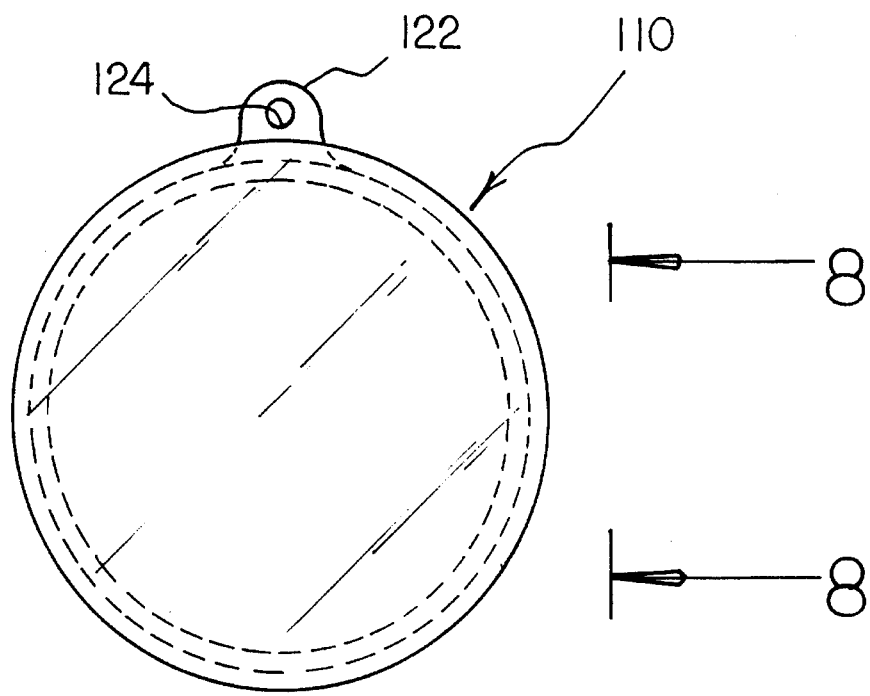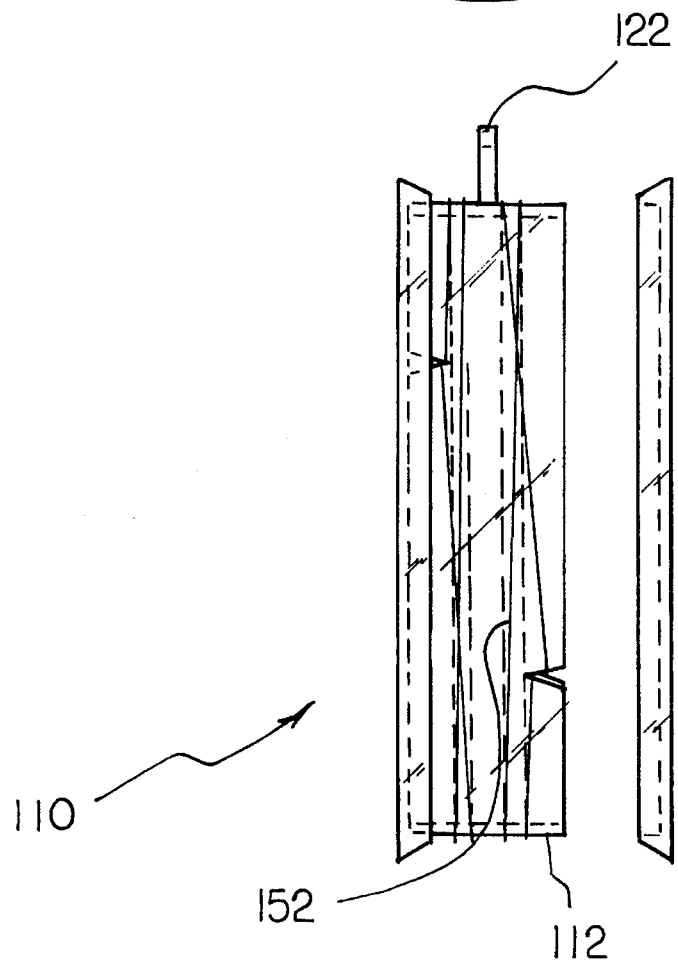

FISHING LURE CONTAINER

BACKGROUND OF THE INVENTION

1. Field of the Invention

The present invention relates to fishing equipment and more particularly pertains to fishing lure containers which may be adapted for storing fishing lures with a leader line attached to prevent tangling with other lures, kinking of the leader line, or injury from exposed fishhooks.

2. Description of the Prior Art

The use of fishing lure containers is known in the prior art. More specifically, fishing lure containers heretofore devised and utilized for the purpose of housing small items of fishing tackle are known to consist basically of familiar, expected and obvious structural configurations, notwithstanding the myriad of designs encompassed by the crowded prior art which have been developed for the fulfillment of countless objectives and requirements.

The present invention is directed to improving devices for storing fishing lures with a leader line attached to prevent tangling with other lures, kinking of the leader line, or injury from exposed fishhooks in a manner which is safe, secure, economical and aesthetically pleasing.

For example, U.S. Pat. No. 4,700,502 to McFarland, et al. discloses a segmented tubular fishing gear container carried on the person and comprising tubular segments joined in end-to-end fashion by fittings on each segment. Stacked cylindrical receptacles may be stowed in the tubular segments as may spools of leader with the leaders being threaded through openings in a tubular segment sidewall.

U.S. Pat. No. 4,813,173 to Abbotnoy describes a fishing lure container having a transparent case with an upper and a lower compartment. In each compartment is a single or double circle of transparent tubes. Each tube has an upper open end that forms the exit port for a lure. Planar caps are located on each end of the transparent container. Each cap has apertures which can be aligned with each tube for removing or inserting lures into the apertures.

The prior art also discloses a portable lure container as shown in U.S. Pat. No. 5,054,669 to Zimbardi et al. which comprises adjustable shelves that can be configured to any size lure chamber. The units of the lure container have a glass or other transparent cover so that the appropriate lure can be predetermined before removing from the container. An important feature of this invention is the dual purpose adjustable handle which can be used both as a handle to carry the container and as an attachment which connects the lure container to the side of a boat. This dual purpose adjustable handle is made up of two complementary pieces or parts which when fitted together constitute either the handle or the boat attachment means.

Additional patents of interest are U.S. Pat. No. 5,095,645 to Borawski which discloses a fishing lure holder and U.S. Pat. No. 5,123,197 to Gentry et al. which discloses a fishing bait organizer.

While these devices fulfill their respective, particular objectives and requirements, the aforementioned patents do not disclose a fishing lure container for storing fishing lures with a leader line attached to prevent tangling with other lures, kinking of the leader line, or injury from exposed fishhooks. Furthermore, none of the prior art fishing equipment teach or suggest a buoyant fishing lure container to allow time for retrieval if dropped into the water.

In this respect, the fishing lure container according to the present invention substantially departs from the conventional concepts and designs of the prior art, and in so doing provides an apparatus primarily developed for the purpose of storing fishing lures with a leader line attached to prevent tangling with other lures, kinking of the leader line, or injury from exposed fishhooks.

Therefore, it can be appreciated that there exists a continuing need for new and improved fishing lure containers which can be used for storing fishing lures with a leader line attached to prevent tangling with other lures, kinking of the leader line, or injury from exposed fishhooks. In this regard, the present invention substantially fulfills this need.

As illustrated by the background art, efforts are continuously being made in an attempt to develop devices for housing small items of fishing tackle. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of fishing lure containers now present in the prior art, the present invention provides an improved fishing lure container construction wherein the same can be utilized for storing fishing lures with a leader line attached to prevent tangling with other lures, kinking of the leader line, or injury from exposed fishhooks. As such, the general purpose of the present invention, which will be described subsequently in greater detail, is to provide a new and improved fishing lure container apparatus and method which has all the advantages of the prior art fishing equipment and none of the disadvantages.

The invention is defined by the appended claims with the specific embodiment shown in the attached drawings. For the purpose of summarizing the invention, the invention may be incorporated into a new and improved fishing lure container for storing fishing lures with a leader line attached to prevent tangling with other lures, kinking of the leader line, or injury from exposed fishhooks. The fishing lure container comprises a tubular transparent envelope formed of rigid impact-resistant waterproof material. The envelope has a length-to-diameter ratio equalling or exceeding one. The envelope also has an open end defining a mouth having a raised lip thereon wherethrough a fishing lure may be passed whereby the lure is contained within the envelope. The other end of the envelope is closed. The lip has a longitudinal V-notch formed therein wherethrough the fishing lure leader line may extend from the envelope, the extending leader line being wrapped around the outside of the envelope for non-kinking storage. The free end of the leader line may optionally reenter the envelope through the V-notch for securement therein.

The new and improved fishing lure container also includes a closure formed of resilient waterproof material snapidly removedly engagable with the lip of the tubular envelope. When engaged, the mouth of the tubular envelope is substantially blocked whereby a fishing lure placed inside the envelope will be retained therein. The closure has a rim therearound engagable with the lip such that the fishing lure leader line passing through the V-notch will be captivated therein. The closure also has a planar top with an integral planar tab projecting orthogonally therefrom. The tab has a lateral hole therethrough whereby the fishing lure container may be hung on a peg or the like for storage, transport, or display.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a fishing lure container for storing fishing lures with a leader line attached to prevent tangling with other lures, kinking of leader line, or injury from exposed fishhooks.

It is therefore an additional object of the present invention to provide a new and improved fishing lure container which has all the advantages of the prior art fishing equipment and none of the disadvantages.

It is another object of the present invention to provide a new and improved fishing lure container which may be easily and efficiently manufactured and marketed.

It is a further object of the present invention to provide a new and improved fishing lure container which is of a durable and reliable construction.

An even further object of the present invention is to provide a new and improved fishing lure container which is susceptible of a low cost of manufacture with regard to both materials and labor, and which accordingly is then susceptible of low prices of sale to the consuming public, thereby making such fishing lure containers economically available to the buying public.

Still yet another object of the present invention is to provide a new and improved fishing lure container which provides in the apparatuses and methods of the prior art some of the advantages thereof, while simultaneously overcoming some of the disadvantages normally associated therewith.

Still yet another object of the present invention is to provide a new and improved fishing lure container that allows the contents to be easily identified and quickly deployed even while fishing from a small boat in poor weather conditions.

Yet another object of the present invention is to provide a new and improved fishing lure container that allows a lure to be stowed with it's leader line attached so the difficult task of attaching the leader during cold or rough conditions is not necessary.

Even still another object of the present invention is to provide a new and improved fishing lure container that is adapted to hold a wide variety of different types and sizes of fishing lures as well as sinkers, hooks, and other small items of fishing tackle.

Yet still another object of the present invention is to provide a new and improved fishing lure container that is buoyant enough to allow time for retrieval if dropped into the water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the present invention new and improved fishing lure container.

FIG. 2 is a side elevational view of the transparent envelope of the invention of FIG. 1 showing its manner of use.

FIG. 7 is a top plan view of a third embodiment of the invention of FIG. 1 wherein the diameter of the envelope is greater than it's length and a mounting tab is shown extending from the side of the envelope.

FIG. 8 is a side elevational view of the invention of FIG. 8 depicting its manner of use.

DESCRIPTION OF THE PREFERRED EMBODIMENT

Figure 3:
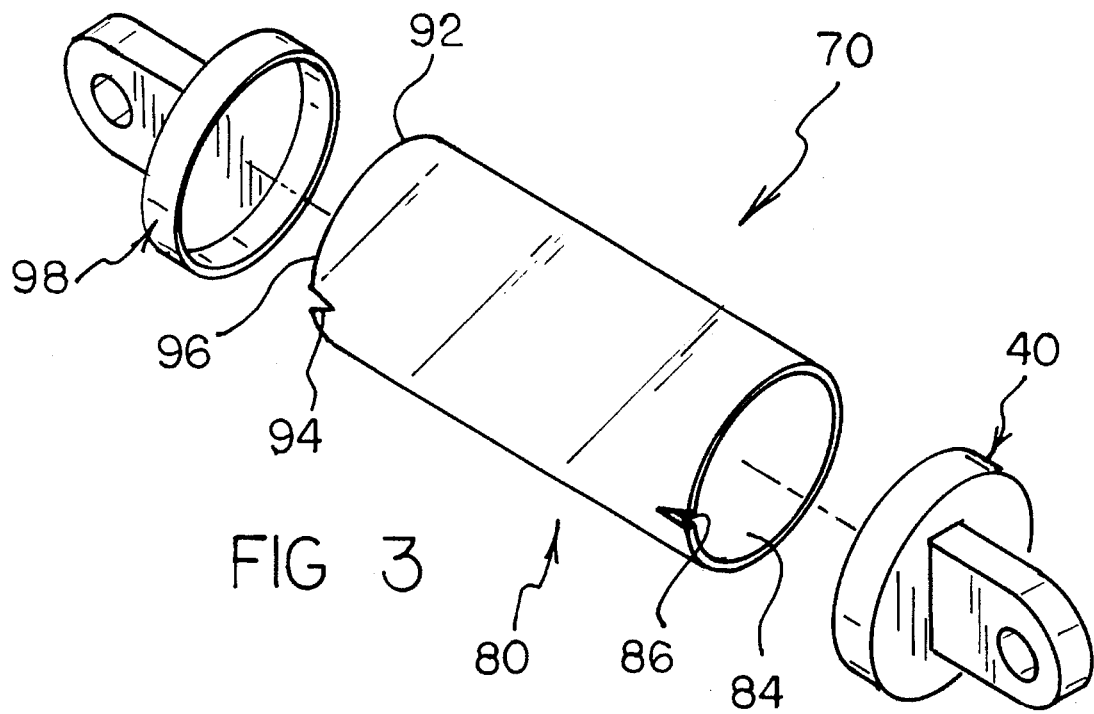
FIG. 3 is a perspective view of an a second embodiment of the invention of FIG. 1 wherein two lures may be contained.

With reference now to the drawings, and in particular to FIG. 1 thereof, a new and improved fishing lure container embodying the principles and concepts of the present invention and generally designated by the reference numeral 10 will be described.

From an overview standpoint, the fishing lure container is adapted for use for storing fishing lures with a leader line attached to prevent tangling with other lures, kinking of the leader line, or injury from exposed fishhooks. See FIG. 2.

With reference now to FIGS. 1 and 2 and more specifically, it will be noted that a new and improved fishing lure container 10 for storing fishing lures 150 with a leader line 152 attached to prevent tangling with other lures, kinking of the leader line, or injury from exposed fishhooks, is shown. The fishing lure container 10 comprises a tubular transparent envelope 20 formed of rigid impact-resistant waterproof material.

The envelope 20 has a length-to-diameter ratio equalling or exceeding one. The envelope 20 also has an open end defining a mouth 26 having a raised lip 22 thereon wherethrough the fishing lure 150 may be passed whereby the lure is contained within the envelope 20. The other end 24 of the envelope 20 is closed. The lip 22 has a longitudinal V-notch 28 formed therein wherethrough the fishing lure leader line 152 may extend from the envelope 20, the extending leader line 152 being wrapped around the outside of the envelope 20 for non-kinking storage. The free end of the leader line 152 may optionally reenter the envelope 20 through the V-notch 28 for securement therein.

The new and improved fishing lure container 10 also includes a closure 40 formed of resilient waterproof material snapidly removedly engagable with the lip 22 of the tubular envelope 20 such that when engaged, the mouth 26 of the tubular envelope 20 is substantially blocked whereby a fishing lure 150 placed inside the envelope will be retained therein. The closure 40 has a rim 42 therearound engagable with the lip 22 such that the fishing lure leader line 152 passing through the V-notch 28 will be captivated therein.

The closure 40 also has a planar top 48 with an integral planar tab 44 projecting orthogonally therefrom. The tab 44 has a lateral hole 46 therethrough whereby the fishing lure container 10 may be hung on a peg or the like for storage, transport, or display.

Figure 4:
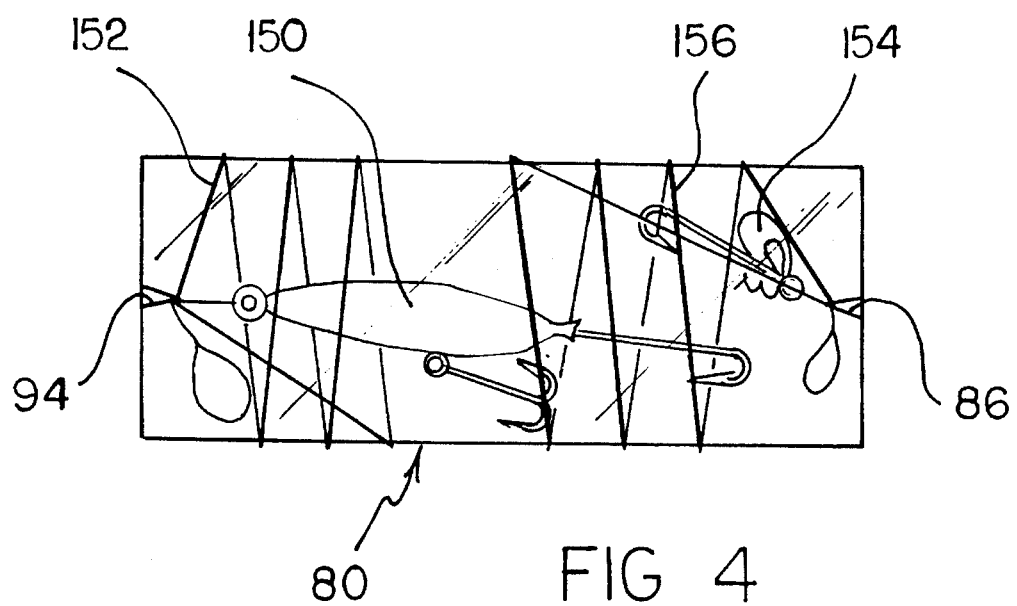
FIG. 4 is a side elevational view of the transparent envelope of the invention of FIG. 3 showing its manner of use with two fishing lures.

Referring to FIGS. 3 and 4, a second embodiment of the new and improved fishing lure container generally designated by the reference numeral 70, having all the features and attributes of the preferred embodiment, also has the additional features now to be described. The second end of the envelope is open defining a second mouth 92. The second mouth 92 has a raised second lip 96 thereon wherethrough a second fishing lure 154 may be passed whereby the second lure 154 may be contained within the envelope 80. The raised second lip 96 has a longitudinal V-notch 94 formed therein wherethrough the leader line 156 of the second fishing lure 154 may extend from inside the envelope 80.

The extending leader line 156 may be wrapped around the outside of the envelope 80 for non-kinking storage, the free end of the leader line 156 may optionally reenter the envelope 80 through the V-notch 94 for securement therein. The second embodiment of the new and improved fishing lure container 70 additionally includes a second closure means 98, essentially identical to the closure means 40 of the first embodiment 10, snapidly removably engagable with the second lip 96 of the tubular envelope 80 such that a leader line passing through the V-notch 94 will be captivated therein.

Figure 5:
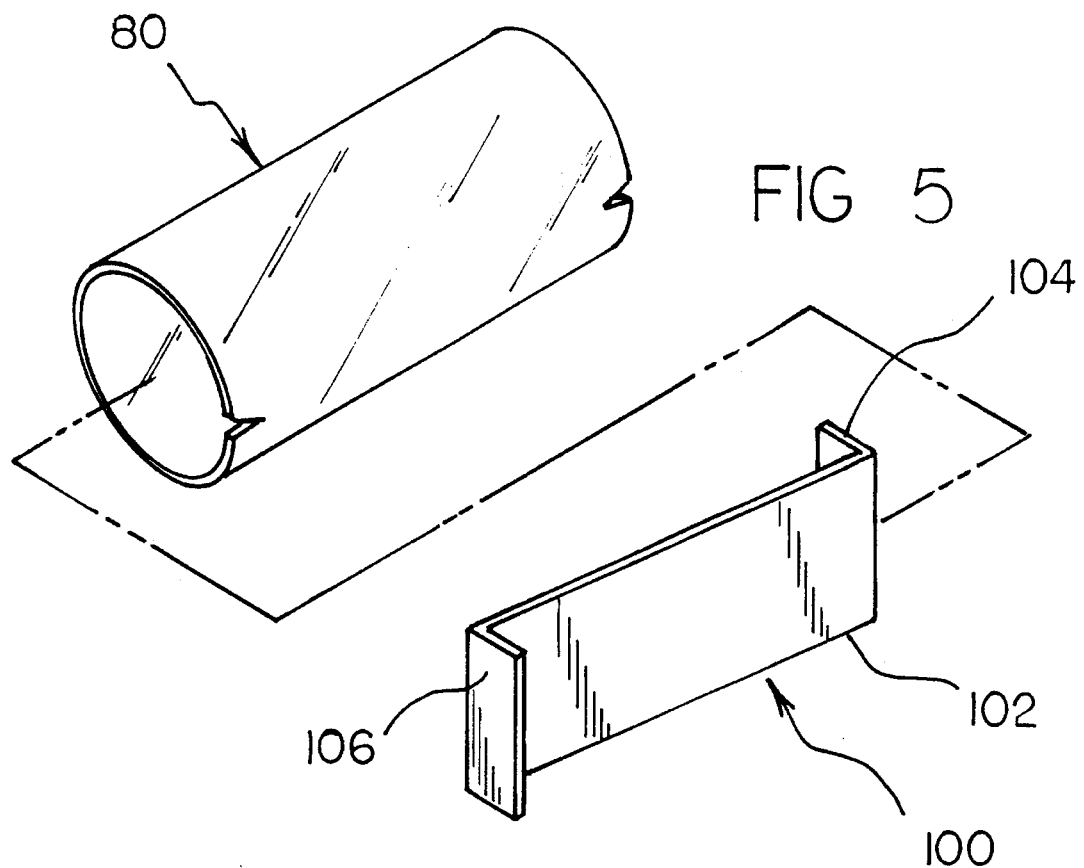
FIG. 5 is a partial exploded view of the invention of FIG. 3 illustrating the placement of an added divider card.
Figure 6:
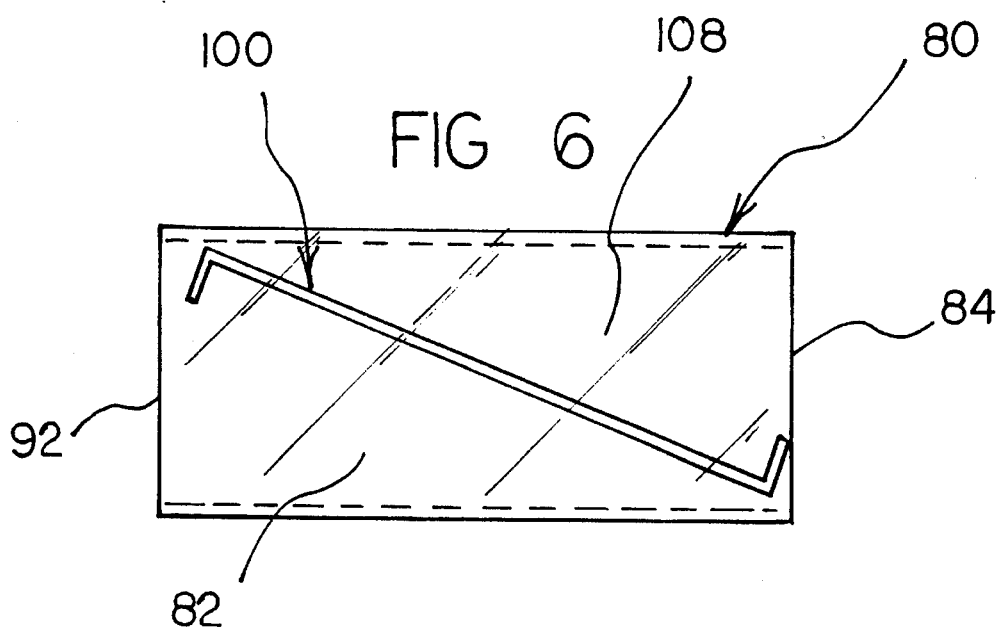
FIG. 6 is a side elevational view of the invention of FIG. 5 showing the divider card properly positioned within the envelope.

The second embodiment 70 further includes a divider 100, shown in FIGS. 5 and 6, which forms two separate compartments 82 and 108 so tangling together of lures 150 and 154 placed in the separate compartments 82 and 108 is precluded. The divider 100 comprises a thin rigid card 102 formed of waterproof material loosely disposed generally longitudinally within the tubular envelop 80.

The divider 100 is positioned such that access to one of the compartments 82 is exclusively through one mouth 92 of the envelope 80, while access to the other compartment 108 is exclusively through the second mouth 84. The divider 100 also has integral opposing lateral ears 104 and 106 extending generally orthogonally from each end of the card 102 whereby the divider 100 is retained mostly stationary within the envelope 80 when the envelope contains less than two lures.

A third embodiment of the new and improved fishing lure container, shown in FIGS. 7 and 8 and generally designated by the reference numeral 110, having all the features and attributes of the embodiments previously described, also has the additional features now to be described. The new and improved fishing lure container 110 envelope 112 has a length-to-diameter ratio of less than one whereby a larger curve is provided for wrapping longer leader lines 152. The third embodiment 110 also has a lateral planar tab 122 projecting radially from the outside surface of the envelope, the tab 122 having a lateral hole 124 therethrough whereby the fishing lure container 110 may be hung on a peg or the like for storage, transport, or display.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A fishing lure container for storing fishing lures with a leader line attached to prevent tangling with other lures, kinking of the leader line, or injury from exposed fishhooks, the fishing lure container comprising:

a tubular transparent envelope formed of rigid impact-resistant waterproof material, the envelope having a length-to-diameter ratio of at least one, the envelope also having one open end defining a mouth having a raised lip thereon wherethrough a fishing lure is passed whereby the lure is contained within the envelope, the lip having a longitudinal V-notch formed therein wherethrough the fishing lure leader line extends from the envelope, the extending leader line is wrapped around the outside of the envelope for non-kinking storage, the free end of the leader line optionally reentering the envelope through the V-notch for securement therein;

a closure formed of resilient waterproof material snappily removedly engagable with the lip of the tubular envelope such that when engaged the mouth of the tubular envelope said mouth is substantially blocked whereby a fishing lure placed inside the envelope is retained therein, the closure having a rim therearound engagable with the lip such that the fishing lure leader line passing through the V-notch is captivated therein, the closure also having a planar top with an integral planar tab projecting orthogonally therefrom, the tab having a lateral hole therethrough whereby the fishing lure container is hung on a peg or the like for storage, transport, and display;

wherein the other end of the envelope is open defining a second mouth having a raised second lip thereon wherethrough a second fishing lure is passed whereby the second lure is contained within the envelope, the raised second lip having a longitudinal V-notch formed therein wherethrough the leader line of the second fishing lure extends from the inside of the envelope, the extending leader line is wrapped around the outside of the envelope for non-kinking storage, the free end of the leader line optionally reentering the envelope through the V-notch for securement therein;

a second closure means removably engagable with the second lip of the tubular envelope, the second closure having a rim therearound engagable with the second lip such that a leader line passing through the V-notch is captivated therein; and divider means in said envelope forming two separate compartments so tangling together of lures placed in the separate compartments is precluded, the divider means comprising a thin rigid card formed of waterproof material loosely disposed generally longitudinally within the tubular envelope, the card being positioned such that access to one of the compartments is exclusively through one mouth of the envelope while access to the other compartment is exclusively through the second mouth, the card also having integral opposing lateral ears extending generally orthogonally from each end thereof whereby the divider card is retained mostly stationary within the envelope when the envelope contains less than two lures.

2. The fishing lure container of claim 1 and further including an integrally connected lateral planar tab projecting radially from an outside surface of the envelope, the tab having a lateral hole therethrough whereby the fishing lure container is hung on a peg for storage, transport, and display.

* * * * *